US011897443B2

(12) United States Patent
Huett

(10) Patent No.: US 11,897,443 B2
(45) Date of Patent: Feb. 13, 2024

(54) ANTILOCK BRAKING SYSTEM FOR A TOWED VEHICLE

(71) Applicant: OZXCORP PTY LTD, Campbellfield (AU)

(72) Inventor: Andrew Huett, Campbellfield (AU)

(73) Assignee: OZXCORP PTY LTD, Campbellfield (AU)

( * ) Notice: Subject to any disclaimer, the term of this patent is extended or adjusted under 35 U.S.C. 154(b) by 411 days.

(21) Appl. No.: 17/416,509

(22) PCT Filed: Dec. 20, 2019

(86) PCT No.: PCT/AU2019/000160
§ 371 (c)(1),
(2) Date: Jun. 20, 2021

(87) PCT Pub. No.: WO2020/124125
PCT Pub. Date: Jun. 25, 2020

(65) Prior Publication Data
US 2022/0080934 A1 Mar. 17, 2022

(30) Foreign Application Priority Data
Dec. 21, 2018 (AU) .................. 2018904915

(51) Int. Cl.
*B60T 8/00* (2006.01)
*B60T 8/1761* (2006.01)
(Continued)

(52) U.S. Cl.
CPC ............ *B60T 8/17616* (2013.01); *B60T 7/20* (2013.01); *B60T 2230/06* (2013.01);
(Continued)

(58) Field of Classification Search
CPC .... B60T 8/17616; B60T 7/20; B60T 2230/06; B60T 2240/00; B60T 2250/00;
(Continued)

(56) References Cited

U.S. PATENT DOCUMENTS 10,421,441 B2 * 9/2019 Sanders ................ B60T 13/662
11,325,810 B2 * 5/2022 Cao ......................... F16D 49/22
(Continued)

*Primary Examiner* — Ian Jen
(74) *Attorney, Agent, or Firm* — Bochner PLLC; Andrew D. Bochner

(57) ABSTRACT

There is disclosed a control system for controlling braking of wheels in a towed vehicle comprising: an electric drum brake associated with at least one wheel of the towed vehicle for applying a braking force to the towed vehicle, the electric drum brake having at least one electro magnet for controlling application of the braking force; and a computer controller electrically coupled to each electric drum brake; wherein, the at least one electro-magnet generates an electric field through which a geometric or magnetic variation present in the electric drum brake passes through upon rotation of the wheel, the computer controller being configured to detect a response signal generated by the passing of the geometric or magnetic variation through the electric field, the response signal being indicative of the state of motion of the wheel.

16 Claims, 5 Drawing Sheets

(51) Int. Cl.
*B60T 7/20* (2006.01)
*F16D 51/20* (2006.01)
*F16D 65/22* (2006.01)
*F16D 121/20* (2012.01)

(52) U.S. Cl.
CPC ....... *B60T 2240/00* (2013.01); *B60T 2250/00* (2013.01); *B60T 2250/03* (2013.01); *F16D 51/20* (2013.01); *F16D 65/22* (2013.01); *F16D 2121/20* (2013.01)

(58) Field of Classification Search
CPC .... B60T 2250/03; B60T 8/1708; B60T 7/206; B60T 8/17; B60T 8/321; B60T 8/248; B60T 8/323; F16D 51/20; F16D 65/22; F16D 2121/20; F16D 55/225; F16D 2055/0016; F16D 2121/24; F16D 2125/40; F16D 2125/50; F16D 65/18
See application file for complete search history.

(56) References Cited

U.S. PATENT DOCUMENTS

| | | | |
|---|---|---|---|
| 11,364,885 B2 * | 6/2022 | Viele | B60T 8/1708 |
| 2019/0016314 A1 * | 1/2019 | Sanders | B60T 13/662 |
| 2019/0047820 A1 * | 2/2019 | Cao | F16D 49/22 |
| 2019/0217831 A1 * | 7/2019 | Viele | G07C 5/0816 |
| 2021/0370892 A1 * | 12/2021 | Stearns | B60Q 1/44 |

* cited by examiner

ANTILOCK BRAKING SYSTEM FOR A TOWED VEHICLE

RELATED APPLICATIONS

The present application claims priority from Australian provisional patent application No. 2018904915 filed on 21 Dec. 2018, the entire contents of which are incorporated herein by reference.

FIELD OF INVENTION

The present invention relates generally to towed vehicles, such as recreational vehicles, caravans, camper trailers and the like, which are towed by a vehicle. In particular, the present invention relates generally to a system and method for controlling the braking system of a towed vehicle to provide a simple means for providing an antilock braking system for such towed vehicles.

BACKGROUND OF THE INVENTION

Recreational vehicles, such as caravans and camper trailers, are a popular form of portable accommodation used by many as an economic and enjoyable way in which to experience the outdoors in an independent and comfortable manner Such vehicles are typically towed behind a car or truck and may be unhitched from the towing vehicle at the destination to be set up as an accommodation site in accordance with the user's personal preferences.

The act of towing a vehicle, such as a caravan or trailer, is one that requires care and attention from the driver of the towing vehicle. Depending on road and weather conditions, it is possible for the towed vehicle to become unstable for at least a period of time during towing, which depending on the experience of the driver, can create a hazardous situation. In this regard, the towed vehicle may experience swaying due to uneven load distribution and road conditions, especially in the presence of a cross-wind or the like. Irrespective of the cause of the swaying movement of the towed vehicle, the driver of the towing vehicle may become concerned which can cause them to act rashly, which can further exacerbate the situation and cause the vehicle to roll over. Further, towing a vehicle can greatly increase the stopping distance of the vehicle due to the increased weight of the combined vehicles and the momentum associated therewith.

To address this problem, many towed vehicles have been fitted with a friction sway control device that is fitted to the frame of the caravan or trailer and which is attached to the hitch receiver. Such a device requires considerable modification of the structure of the towed vehicle and provides only minimal effect.

More recently, it has become mandatory in many jurisdictions for caravans and trailers over a specific weight to be fitted with an auxiliary braking system, such as electrically controlled brakes. In such systems, a control system is installed in the towing vehicle that controls the towed vehicle's brakes to be applied automatically when the towing vehicle's brakes are applied. Such a system ensures that the caravan's electric brakes are applied to the wheels of the caravan in proportion to the towing vehicles brakes. However, whilst this system has been effective in reducing the weight load of the caravan acting upon the towing vehicle during towing, it is prone to being set with too little or too much gain that leads to wheel skidding and/or increased stopping distances. It also does not compensate for changes in road and weather conditions, and has minimal effect on controlling vehicle sway.

Further to this, with the provision of more sophisticated caravans that are capable of applying drive forces to the wheels of the caravan during towing to minimise the load exonerated by the towing vehicle, there are options to provide more control of the motion of the wheels of the towed vehicle than has happened previously.

Thus, the present invention is directed towards providing a simple and effective means for controlling the braking wheel motion of the towed vehicle without the need for considerable and complicated external systems that require driver setup and the costs associated therewith.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

Accordingly, in one aspect of the present invention there is provided a braking control system for controlling braking of wheels in a towed vehicle comprising:
- an electric drum brake associated with at least one wheel of the towed vehicle for applying a braking force to the towed vehicle, the electric drum brake having at least one electro magnet for controlling application of the braking force;
- a computer controller electrically coupled to each electric drum brake, for applying a sensing signal across at least one electro magnet of the electric drum brake;
- wherein, the at least one electro-magnet generates an electric field through which a geometric or magnetic variation present in the electric drum brake passes through upon rotation of the wheel, the computer controller being configured to detect a response signal generated by the passing of the geometric or magnetic variation through the electric field, the response signal being indicative of the state of motion of the wheel.

In one embodiment, the state of motion of the wheel that is indicative of the response signal is the rotational speed of the wheel.

In one form, the geometric or magnetic variation present in the electric drum brake comprise studs for connecting the wheel to the electric drum brake. In another form, the geometric or magnetic variation present in the electric drum brake comprise cavities formed in the drum brake wall. In yet another form, the geometric or magnetic variation present in the electric drum brake comprise markings formed in the drum brake wall.

The response signal may comprise an induced magnetic reluctance signal induced by passage of one or more studs, drum brake wall cavities or drum brake wall markings passing through the electric field.

The state of motion of the wheels of the towed vehicle may be used by a computing system associated with the towed vehicle to controlling the braking of the wheels.

In one embodiment, the computing system of the towed vehicle receives the response signals and determines whether one or more of the wheels of the towed vehicle is in a skidding motion or not.

Determination of whether the wheel is in a skidding motion may be based on whether the computing system of the towed vehicle detects presence of a response signal or whether the response signal indicates that the wheel is locked or slowing down too quickly.

Failure of the computing system of the towed vehicle to detect a response signal may indicate that the wheel is in a skidding motion.

Upon determining that the wheel is in a skidding motion, the computing system of the towed vehicle may request the electric drum brake associated with the wheel to release the wheel momentarily to prevent further skidding of the wheel.

In another embodiment, the state of motion of the wheels of the towed vehicle is used by a computing system associated with the towed vehicle to control the swaying of the towed vehicle.

The computing system associated with the towed vehicle may receive the response signals from each of the wheels of the towed vehicle to determine a reference speed of the towed vehicle. The computing system may then monitor the speed of each of the wheels to compare the individual wheel speeds against the reference speed of the vehicle to determine a presence of unwanted movement of the towed vehicle with respect to the towing vehicle. Upon determination of unwanted movement of the towed vehicle by the computing system, the computing system may apply at least one brake to at least one of the wheels to minimise unwanted movement.

The towed vehicle may include one or more additional sensors for determining unwanted movement of the towed vehicle and each additional sensor communicates with the computing system of the towed vehicle to transmit movement data periodically.

The one or more additional sensors include, accelerometers, yaw rate sensors and force sensors attached to a body of the towed vehicle.

BRIEF DESCRIPTION OF THE DRAWINGS

The invention may be better understood from the following non-limiting description of preferred embodiments, in which.

DETAILED DESCRIPTION

The present invention will be described below in relation to caravan of the type that is to be towed by a vehicle. However, it will be appreciated that the present invention could be equally employed in any variety of recreational vehicles and camper trailers that are to be towed by a vehicle and still fall within the spirit of the present invention. The present invention is also applicable for use in controlling braking or driving forces for any type of electric brake used in any application, such as self-powered vehicles.

Figure 1:
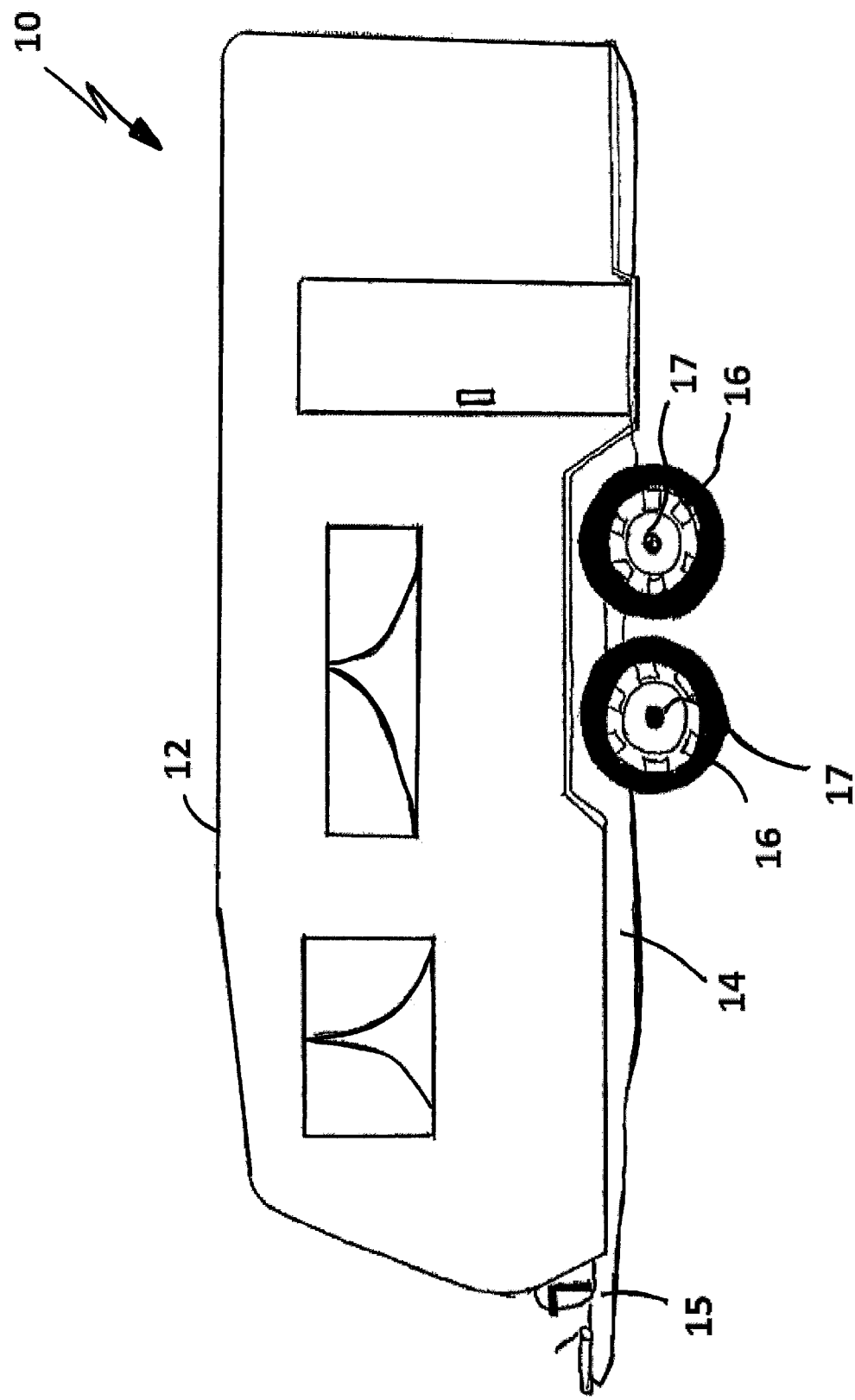
FIG. 1 is a side view of caravan suitable for use with the present invention.

Referring to FIG. 1, a caravan 10 is depicted for application of the present invention in accordance with an embodiment thereof. The caravan 10 is of a conventional type and comprises a chassis 14 that supports a body 12. The body 12 forms an enclosure over the top of the chassis 14 and is configured to function as a mobile accommodation space as is well known in the art. A hitch 15 is attached to a front end of the chassis 14. The hitch 15 attaches to the towing vehicle (not shown) and may be configured in a variety of different ways so as to provide secure attachment to the towing vehicle as well as the transfer of control signals from the towing vehicle to the caravan 10 to operate the turning signals of the caravan 10 and various other functions as would be well understood by those skilled in the art.

The chassis is supported above a ground surface by way of a pair of wheels 16 mounted upon a pair of axles 17 that extend across the chassis 14. Each of the wheels 16 are mounted on opposing ends of the axles 17 with the axles 17 usually centrally located with respect to the caravan 10. Each of the wheels 16 are free to rotate on the axle under the towing force supplied by the towing vehicle.

In order for the caravan 10 to be used in off-road applications, the wheels 16 may be mounted to the chassis by way of shock absorbers or struts and the axles 17 may comprise suspension systems so as to avoid damage to the caravan during traverse across rough terrain.

Figure 2:
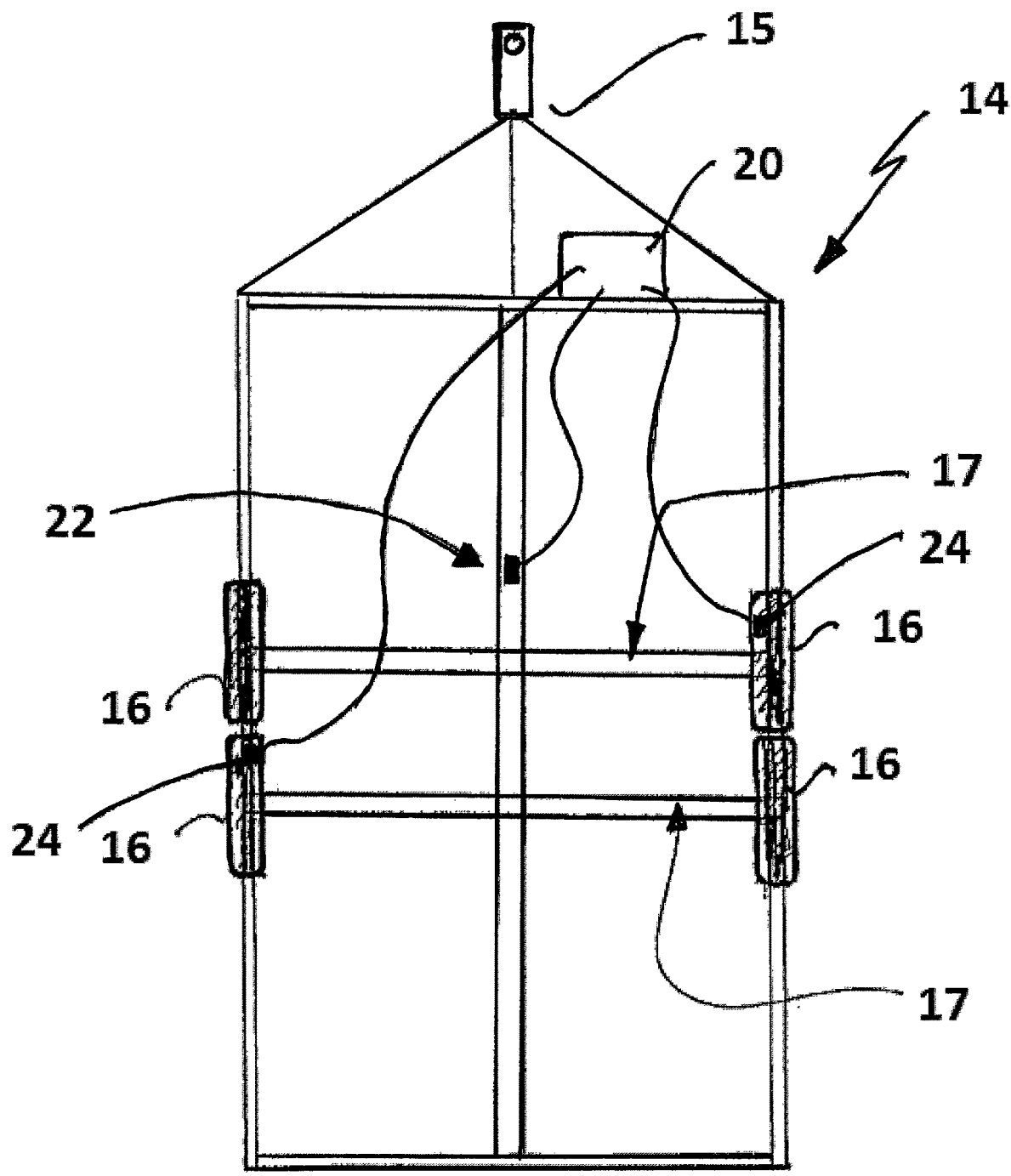
FIG. 2 is a top view of a chassis of the caravan of FIG. 1 depicting the features of the system of the present invention fitted thereto.

Referring to FIG. 2, the chassis 14 is depicted in isolation. A computer system 20 is mounted in the caravan 10 and is able to receive signals from motion sensors 24 located in the vehicle or chassis associated with at least one of each pair of wheels 16, in accordance with an embodiment of the present invention. One or more additional sensors 22 may be mounted to the chassis such as accelerometers, yaw rate sensors and force sensors to assist in stability and sway control of the towed vehicle.

Figure 3:
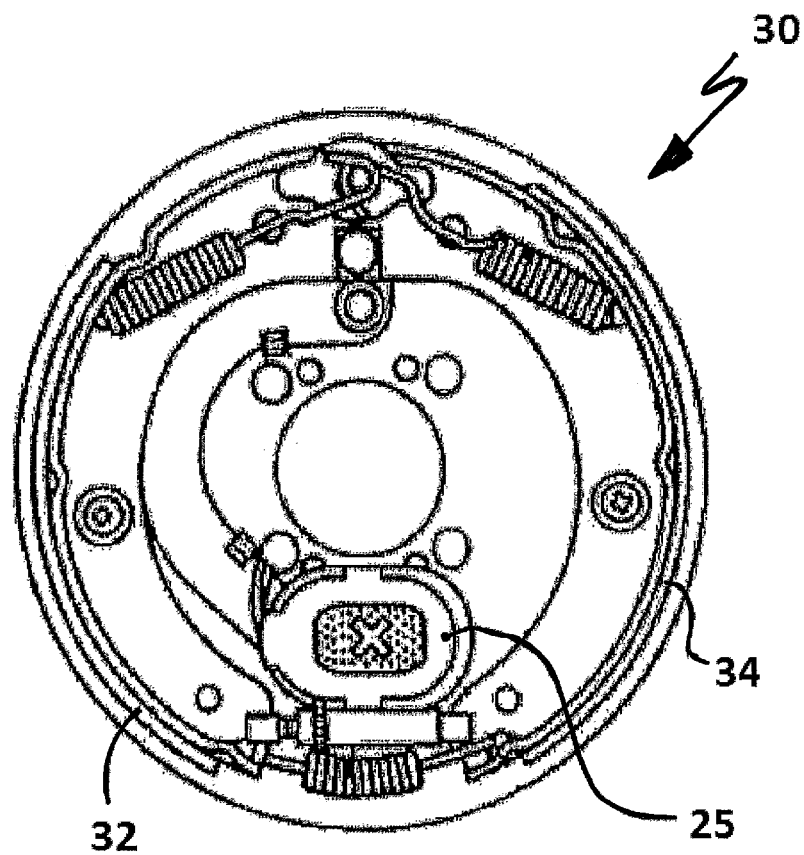
FIG. 3 is a front view of a drum brake assembly with the outer drum removed.
Figure 4:
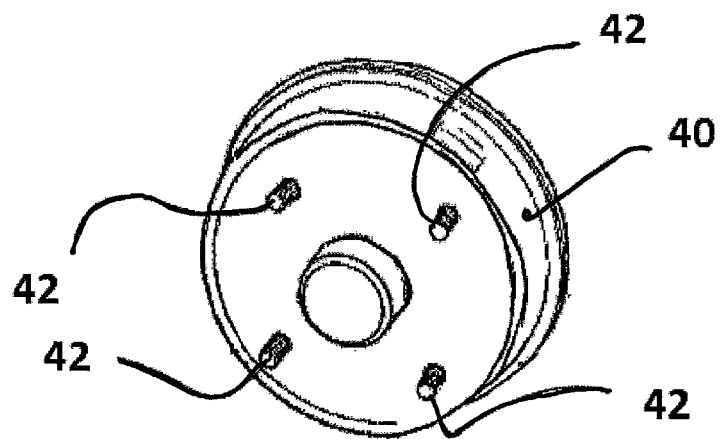
FIG. 4 is a front perspective view of a drum assembly with the outer drum fitted.

One embodiment depicting the manner in which the motion sensors 24 may be configured to monitor motion of the or each wheel 16 of the caravan is depicted in FIGS. 3 and 4.

The motion sensor 24 of this embodiment utilises the existing electric brake hub 30 present on the wheel 16 to determine the state of rotation of each of the wheels 16. This is achieved by utilising the electro-magnet 25 as depicted, which is conventionally used to cause the primary brake shoe 32 and the secondary brake shoe 34 to expand and grip the inner walls of the outer drum 40 to brake the wheel 16. The wheel 16 is mounted to the outer drum 40 by way of studs 42, as depicted in FIG. 4. Therefore, the wheel studs 42 will rotate with the wheel 16 as the wheel 16 rotates during motion of the caravan. Whilst not shown, the inner ends of the studs 42 sit within cavities formed in an inner surface of the outer drum, such that as the wheel rotates, the cavities housing the wheel studs 42 rotate over, and in close proximity to, the electromagnet 25.

Due to the already existing presence of the electro-magnet 25 in the brake system, by applying a sensing voltage to the electro-magnet 30, it is possible to generate a magnetic field within the brake hub 30. This enables the cavities containing the studs 42 or 43 to rotate within the field, which generates a response signal as the cavities containing the studs 42 pass therethrough. When the brakes are off, signal detection can be determined by applying a small voltage continuously. If the braking output/requested voltage is pulse width modulation (PWM) controlled, the "off" portion can be maintained at a sufficient voltage to enable reading of the signal.

In an alternative embodiment, a larger voltage pulse can be applied to the electro-magnet 30 so as to pull the brake coil/s into contact with the drum to ensure more accurate reading of the signal. Such a pulse can be supplied in response to a reduction in the received signal, which may indicate that the coil has moved away slightly due to a bump or vibration in the road surface. In this regard, the larger voltage pulse can be applied periodically on some time related basis to compensate for any movement of the coil over time.

By passing a control signal through the electro-magnet 25, the magnetic reluctance induced within the circuit each time cavity a 42 passes through, can be detected and analysed. Due to the rotatory motion of the wheel and the cavities containing the studs studs 42 passing through the electro-magnetic field generated by the electro magnet 25, the resultant induced magnetic reluctance signals will resemble a sinusoidal wave, about a frequency of the signal being passed through the brake coil. For instance, for a 2V sensing signal the magnetic reluctance detected by the coil will generate a signal such as that shown in FIG. 5. It will be appreciated that additional cavities may be formed in the drum to increase the signal resolution. Alternatively, additional electro-magnets/coils may be employed in each brake system. Such a configuration could generate more pulses per revolution, significantly increasing resolution of wheel speed.

The system functions by measuring a variation in inductance present in the system, which is caused by a variation in reluctance as the wheel rotates. This is generated due to geometry or material changes in the path of the sensing coil. This may also be replicated by introducing magnetic variations around the brake drum.

Figure 5:
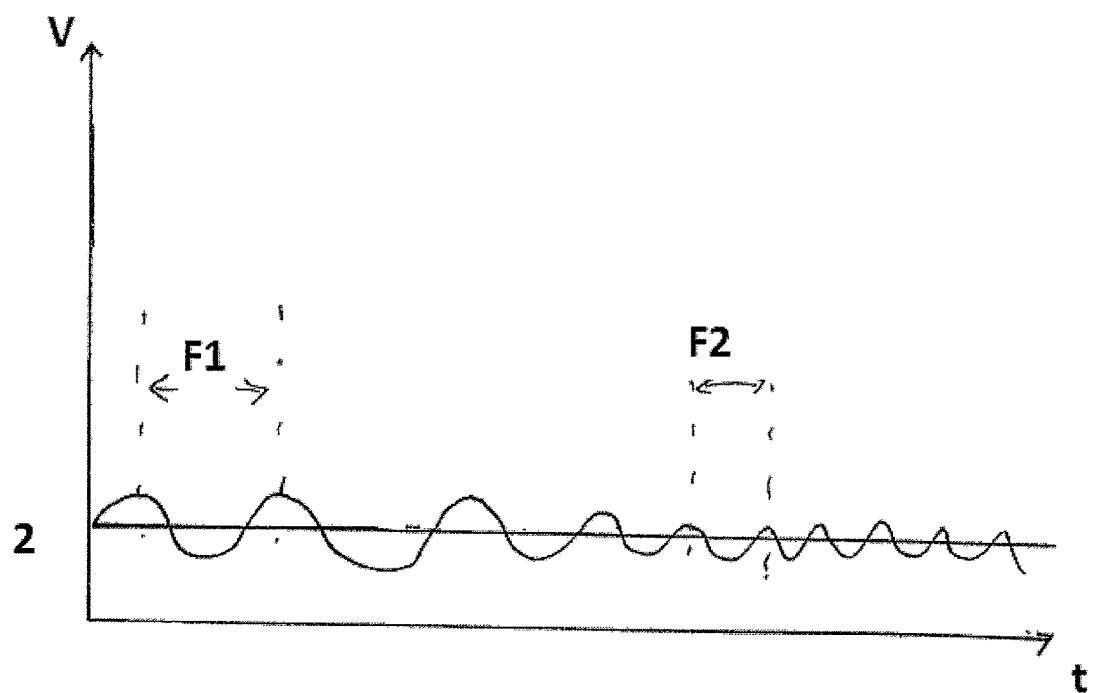
FIG. 5 is a graph depicting an example representing of a response signal associated with an embodiment of the present invention.
Figure 6:
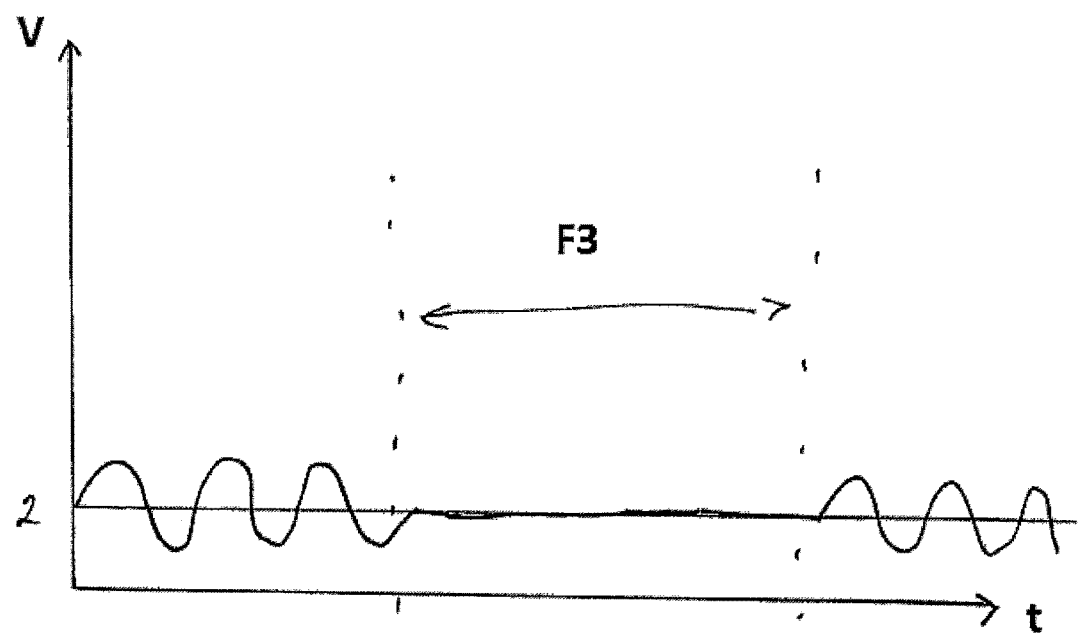
FIG. 6 is a graph depicting an example representing of a response signal showing a skidding wheel associated with an embodiment of the present invention.

The continuous sinusoidal signal of FIG. 5 will be detected and transmitted to the computer system 20 for processing. The difference in Frequency $F_1$ and $F_2$ of the signal will be indicative of the speed of the wheel, with the higher frequency $F_2$ being indicative of the wheel being of a higher speed than the lower frequency $F_1$ If the signal processed by the computer system 20 indicates that the signal has stopped, as is shown as $F_3$ in FIG. 6, this is indicative of the wheel being in a skidding state wherein the caravan is still moving but the wheel is stationary.

Whilst, in the simplest form, wheel speed is able to be determined by assessing the time between signals or pulses, additional resolution and a quicker response can be obtained by comparing the shape of each curved pulse or signal received to the previously received pulse or signal. Similarly, comparison of the shape of the curved pulse or signal received between wheels can be employed to determine the wheel speed and to determine whether it is trending to being shorter or longer, thus indicating an increase or decrease in wheel speed.

Figure 7:
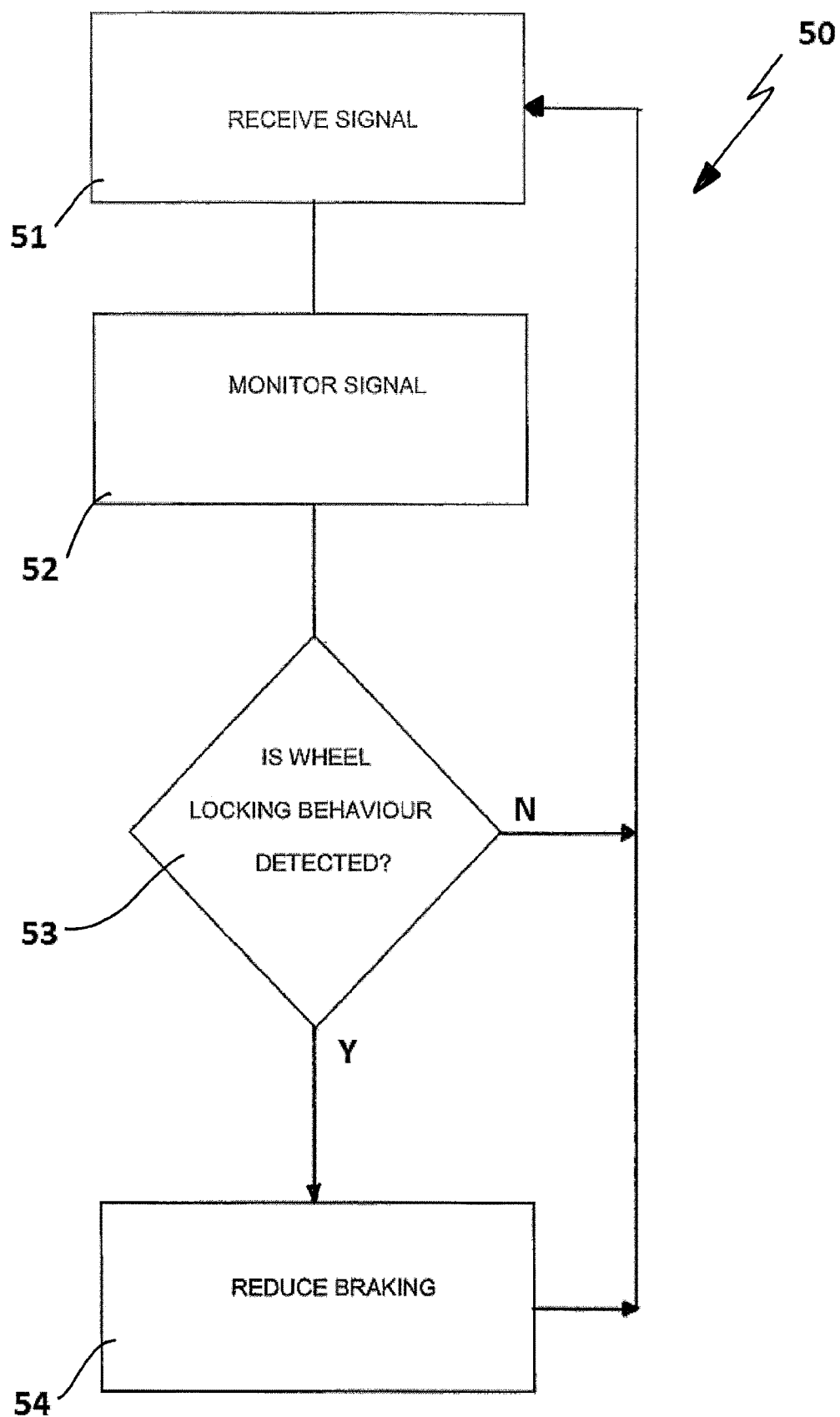
FIG. 7 is a flow chart depicting a method of controlling a braking control system for controlling braking of wheels in a towed vehicle in accordance with the present invention.

The computer system 20 of the caravan 10 will control the braking system using the detected signals by the method 50 depicted in FIG. 7.

In step 51, the computer system 20 will receive the detected signal for each wheel and this signal will be monitored for changes, in step 52. If the signal is present, the computer system will continue to receive and monitor the signal in steps 51 and 52.

In step 53, the computer system determines whether wheel locking behaviour is being detected. Such a condition may be detected through a loss of the signal being received from a wheel, which is indicative of the wheel skidding under braking. In such a situation, the computer system 20 will detect this situation as a wheel skid in step 54, and will send a control signal to the brake system for the braking being applied to that wheel to be reduced momentarily to enable the wheel to move out of the skid condition. Once this occurs, braking for that wheel will be increased to slow the wheel again, as desired.

This procedure will be repeated continuously until braking is completed.

It will be appreciated that the brake control system of the present invention could be employed with a variety of other sensors for detecting road or driving conditions for controlling the braking of the caravan. This may include weight sensors and force sensors that detect variations in weight distribution in the vehicle that may induce such events as trailer sway or instability. It may also include yaw and/or acceleration sensors to complement the wheel speed information. All this information could be used in conjunction with the present invention to control the manner in which the brake system can be controlled to ensure a smoother and safer journey. This may include employing driving motors with each of the wheels and controlling the state of the driving motors to better control the caravan towing experience.

It will be appreciated that the system and method of the present invention provides a cheaper brake control system as it requires no additional parts and merely utilises existing parts and systems of the existing brake system. As the system and method of the present invention directly measures the rotation of each wheel, it can provide for immediate response times and allows greater options in relation to sway or stability control, and improved stopping distances and avoids the need to pre-set brake performance and for providing separate parts for adapting the braking system.

Additional benefits come from measuring wheel speeds continuously. This can be done by applying a small voltage, or employing a permanent magnet, which does not cause concerning levels of brake wear, or measuring the signal generated with zero voltage applied. Such continuous data collection allows for continuous monitoring for the presence of sway in the vehicle, as well as oversteer and understeer conditions, whereby the application of the brakes can be employed to correct such conditions. During such corrections, the ABS functions to maximise braking and vehicle control.

The above described system also makes it possible to implement sway control of the caravan or towed vehicle using wheel speeds. This can be achieved by:
(a) measuring the wheel speeds of the towed vehicle and define a reference speed for the towed vehicle;
(b) monitor wheel speeds of the towed vehicle (left vs right) and compare these speeds to the reference speed to define the amount of and frequency of trailer movement; and
(c) apply at least one brake to the wheels(s) to reduce the sway.

During step (b) additional sensors can be used as inputs, including accelerometers, yaw rate sensors and force sensors. In addition, information from the towing vehicle can be used in making this decision, such as provided from the vehicle's on-board diagnosis (OBD) port, or from the trailer braking controller in the towing vehicle.

A stability control system can also be employed in a similar manner to sway control. In employing stability control using individual wheel motion, sensors that determine the angle or path of the towed vehicle compared to the towing vehicle are located on the towed vehicle, such as yaw rate sensors or the like. Upon detection of the path of the towed vehicle moving away from the path of the towing vehicle, the braking of the wheels of the towed vehicle can be controlled on the appropriate side of the towed vehicle to realign the paths of both vehicles.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

It will be appreciated by those skilled in the art that many modifications and variations may be made to the methods of the invention described herein without departing from the spirit and scope of the invention.

The claims defining the invention are as follows:

1. A braking control system for controlling braking of wheels in a towed vehicle comprising:
   an electric drum brake associated with at least one wheel of the towed vehicle for applying a braking force to the towed vehicle, the electric drum brake having at least one electro magnet for controlling application of the braking force; and
   a computer controller electrically coupled to each electric drum brake;
   wherein, the at least one electro-magnet generates an electric field through which a geometric or magnetic variation present in the electric drum brake passes through upon rotation of the wheel, the computer controller being configured to detect a response signal generated by the passing of the geometric or magnetic variation through the electric field, the response signal being indicative of the state of motion of the wheel.

2. A braking control system according to claim 1, wherein the computer controller is configured to apply a sensing signal across at least one electro-magnet of the electric drum brake to generate said electric field.

3. A braking control system according to claim 1, wherein the state of motion of the wheel that is indicative of the response signal is the rotational speed of the wheel.

4. A braking control system according to claim 1, wherein the geometric or magnetic variation present in the electric drum brake comprise studs for connecting the wheel to the electric drum brake.

5. A braking control system according to claim 1, wherein the geometric or magnetic variation present in the electric drum brake comprise cavities formed in an interior surface of the drum brake wall.

6. A braking control system according to claim 1, wherein the geometric or magnetic variation present in the electric drum brake comprise markings formed in an interior surface of the drum brake wall.

7. A braking control system according to claim 3, wherein the response signal comprises an induced magnetic reluctance signal induced by passage of one or more studs, drum brake wall cavities or drum brake wall markings passing through the electric field.

8. A braking control system according to claim 1, wherein the state of motion of the wheels of the towed vehicle is used by a computing system associated with the towed vehicle to controlling the braking of the wheels.

9. A braking control system according to claim 7, wherein the computing system of the towed vehicle receives the response signals and determines whether one or more of the wheels of the towed vehicle is in a skidding motion or not.

10. A braking control system according to claim 8, wherein the determination of whether the wheel is in a skidding motion is based on whether the computing system of the towed vehicle detects presence of a response signal or whether the response signal indicates that the wheel is locked or slowing down too quickly.

11. A braking control system according to claim 9, wherein failure of the computing system of the towed vehicle to detect a response signal indicates that the wheel is in a skidding motion.

12. A braking control system according to claim 10, wherein upon determining that the wheel is in a skidding motion, the computing system of the towed vehicle requests the electric drum brake associated with the wheel to release the wheel momentarily to prevent further skidding of the wheel.

13. A braking control system according to claim 1, wherein the state of motion of the wheels of the towed vehicle is used by a computing system associated with the towed vehicle to control the swaying of the towed vehicle.

14. A braking control system according to claim 12, wherein the computing system associated with the towed vehicle receives the response signals from each of the wheels of the towed vehicle to determine a reference speed of the towed vehicle; the computing system then monitors the speed of each of the wheels to compare the individual wheel speeds against the reference speed of the vehicle to determine the presence of unwanted movement of the towed vehicle with respect to the towing vehicle; and upon determination of unwanted movement of the towed vehicle by the computing system, the computing system applies at least one brake to at least one of the wheels to minimise unwanted movement.

15. A braking control system according to claim 13, wherein the towed vehicle includes one or more additional sensors for determining unwanted movement of the towed vehicle and each additional sensor communicates with the computing system of the towed vehicle to transmit movement data periodically.

16. A braking system according to claim 14, wherein the one or more additional sensors include, accelerometers, yaw rate sensors and force sensors attached to a body of the towed vehicle.

* * * * *